(12) United States Patent
Siddiqui et al.

(10) Patent No.: US 12,165,170 B2
(45) Date of Patent: Dec. 10, 2024

(54) MACHINE-LEARNING SYSTEM FOR CLICKSTREAM-BASED CONTENT INTEREST PREDICTION

(71) Applicant: TD Ameritrade IP Company, Inc., Omaha, NE (US)

(72) Inventors: Tajdar Shameem Siddiqui, Ellicott City, MD (US); Stephen Filios, Canton, MI (US); Michelle Schroeder, O'Fallon, MO (US); Logan Sommers Ahlstrom, Ann Arbor, MI (US)

(73) Assignee: CHARLES SCHWAB & CO., INC., San Francisco, CA (US)

( * ) Notice: Subject to any disclaimer, the term of this patent is extended or adjusted under 35 U.S.C. 154(b) by 1077 days.

(21) Appl. No.: 17/085,571

(22) Filed: Oct. 30, 2020

(65) Prior Publication Data

US 2022/0138795 A1    May 5, 2022

(51) Int. Cl.
  *G06Q 30/0242* (2023.01)
  *G06F 18/2415* (2023.01)
  *G06N 5/046* (2023.01)
  *G06N 20/00* (2019.01)

(52) U.S. Cl.
  CPC ... *G06Q 30/0246* (2013.01); *G06F 18/24155* (2023.01); *G06N 5/046* (2013.01); *G06N 20/00* (2019.01)

(58) Field of Classification Search
  None
  See application file for complete search history.

(56) References Cited

U.S. PATENT DOCUMENTS

| | | | |
|---|---|---|---|
| 10,970,463 B2* | 4/2021 | Noursalehi | G06N 20/00 |
| 2008/0162574 A1* | 7/2008 | Gilbert | G06Q 30/02 |
| 2009/0259540 A1* | 10/2009 | Phan | G06Q 30/0241 |
| | | | 705/14.73 |
| 2016/0292722 A1* | 10/2016 | Myers | G06Q 30/0243 |
| 2020/0065357 A1* | 2/2020 | Noursalehi | G06F 40/106 |
| 2021/0241091 A1* | 8/2021 | Neumann | G06N 3/061 |

* cited by examiner

*Primary Examiner* — Haimei Jiang
(74) *Attorney, Agent, or Firm* — Harness, Dickey & Pierce, P.L.C.

(57) ABSTRACT

A method includes receiving client data of a client that includes at least one of clickstream data and analytic data of the client. For each of a number of trained machine learning (ML) models corresponding, respectively, to a number of campaigns, campaign-specific features are extracted from the client data, and a campaign interest prediction score is generated by inputting the campaign-specific features extracted for the ML model into the ML model. At least one campaign, from among the plurality of campaigns, is assigned to the client based on the generated campaign interest prediction scores. The clickstream data includes a plurality of pages visited by the client, and the analytic data of the client includes at least one of phone call data, chat message data, email data, or survey data of the client.

16 Claims, 7 Drawing Sheets

MACHINE-LEARNING SYSTEM FOR CLICKSTREAM-BASED CONTENT INTEREST PREDICTION

FIELD

The present disclosure relates to large-scale data processing and more particularly to using artificial intelligence to predict client interest in various content.

BACKGROUND

A company may have multiple marketing campaigns running at the same time for its clients. The choice of which marketing campaign to associate with each individual client may be made in a number of ways including basing the choice on information about the client. Presently, a company may use information about each of its clients to help determine which campaign is likely to be of interest to each client. However, when an amount of client information a company possesses grows to become vast, the task of organizing the client information so the company can use the client information effectively can become substantially more difficult.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method includes receiving client data of a client, the client data including at least one of clickstream data or analytic data of the client. The method further includes, for each of a plurality of trained machine learning (ML) models corresponding, respectively, to a plurality of campaigns extracting campaign-specific features from the client data, and generating a campaign interest prediction score by inputting the campaign-specific features extracted for the ML model into the ML model. The method further includes assigning at least one campaign, from among the plurality of campaigns, to the client based on the generated campaign interest prediction scores. The clickstream data includes a plurality of pages visited by the client, and the analytic data of the client includes at least on of phone call data, chat message data, email data, or survey data of the client.

In other features, the plurality of campaigns are marketing campaigns.

In other features, the assigning of the at least one campaign includes determining a highest campaign interest prediction score from among the campaign interest prediction scores generated for the plurality of ML models; and assigning a first campaign to the client. The first campaign may be the campaign, from among the plurality of campaigns, to which the ML model that generated the highest campaign interest prediction score corresponds.

In other features, the plurality of trained ML models includes at least a first ML model and a second ML model, the campaign-specific features extracted from the client data for the first ML model are extracted in accordance with a first campaign-specific feature set, the campaign-specific features extracted from the client data for the second ML model are extracted in accordance with a second campaign-specific feature set, and the second campaign-specific feature set is different from the first campaign-specific feature set such that the campaign-specific features extracted from the client data for the first ML model are different from the campaign-specific features extracted from the client data for the second ML model.

In other features, each ML model is a Bernoulli naive Bayes classifier.

In other features, the method includes, for each campaign among the plurality of campaigns identifying a campaign-specific feature set, extracting training data from historical client data of a plurality of clients based on the identified campaign-specific feature set, and generating the trained ML model, from among the plurality of trained ML models, that corresponds to the campaign by training a model based on the extracted training data.

In other features, the identifying of a campaign-specific feature set for each campaign includes determining a first group of clients, the first group of clients being composed of clients who have performed an activity of interest with respect to the campaign, from among the plurality of clients; determining a first plurality of pages visited by the first group of clients within a window of time; determining, for each page among the first plurality of pages, a first frequency and a second frequency, the first frequency is a number of clients, from among the first group of clients, that visited the page within the window of time, and the second frequency is a number of clients, from among the plurality of clients, that visited the page within the window of time; and determining which pages, from among the first plurality of pages, to include in the campaign-specific feature set of the campaign based on the first and second frequencies determined for each of the first plurality of pages.

In other features, the determining which pages, from among the first plurality of pages, to include in the campaign-specific feature set of the campaign includes determining, for each page among the first plurality of pages, a ratio value based on the first frequency and the second frequency of the page; and including, in the campaign-specific feature set of the campaign, pages, from among the first plurality of pages, that have ratio values which exceed a reference ratio threshold.

In other features, the determining of which pages, from among the first plurality of pages, to include in the campaign-specific feature set of the campaign includes excluding, from the campaign-specific feature set of the campaign, pages, from among the first plurality of pages, that have ratio values that do not exceed the reference ratio threshold or have first frequencies that do not exceed a reference frequency threshold.

A computer system includes memory storing computer-executable instructions; and a processor configured to execute the computer-executable instructions. The computer-executable instructions include receiving client data of a client, the client data including at least one of clickstream data or analytic data of the client; for each of a plurality of trained machine learning (ML) models corresponding, respectively, to a plurality of campaigns, extracting campaign-specific features from the client data, and generating a campaign interest prediction score by inputting the campaign-specific features extracted for the ML model into the ML model; and assigning at least one campaign, from among the plurality of campaigns, to the client based on the generated campaign interest prediction scores. The clickstream data includes a plurality of pages visited by the client, and the analytic data of the client includes at least one of phone call data, chat message data, email data, or survey data of the client.

In other features, the plurality of campaigns are marketing campaigns.

In other features, the assigning of the at least one campaign includes determining a highest campaign interest prediction score from among the campaign interest prediction scores generated for the plurality of ML models; and assigning a first campaign to the client. The first campaign may be the campaign, from among the plurality of campaigns, to which the ML model that generated the highest campaign interest prediction score corresponds.

In other features, the plurality of trained ML models includes at least a first ML model and a second ML model, the campaign-specific features extracted from the client data for the first ML model are extracted in accordance with a first campaign-specific feature set, the campaign-specific features extracted from the client data for the second ML model are extracted in accordance with a second campaign-specific feature set, and the second campaign-specific feature set is different from the first campaign-specific feature set such that the campaign-specific features extracted from the client data for the first ML model are different from the campaign-specific features extracted from the client data for the second ML model.

In other features, each ML model includes a Bernoulli naive Bayes classifier.

In other features, the computer-executable instructions further include, for each campaign among the plurality of campaigns, identifying a campaign-specific feature set, extracting training data from historical client data of a plurality of clients based on the identified campaign-specific feature set, and generating the trained ML model, from among the plurality of trained ML models, that corresponds to the campaign by training a model based on the extracted training data.

In other features, the identifying of a campaign-specific feature set for each campaign includes determining a first group of clients, the first group of clients being composed of clients who have performed an activity of interest with respect to the campaign, from among the plurality of clients; determining a first plurality of pages visited by the first group of clients within a window of time; and determining, for each page among the first plurality of pages, a first frequency and a second frequency. The first frequency is a number of clients, from among the first group of clients, that visited the page within the window of time, and the second frequency is a number of clients, from among the plurality of clients, that visited the page within the window of time. The identifying of a campaign-specific feature set for each campaign further includes determining which pages, from among the first plurality of pages, to include in the campaign-specific feature set of the campaign based on the first and second frequencies determined for each of the first plurality of pages.

In other features, the determining which pages, from among the first plurality of pages, to include in the campaign-specific feature set of the campaign incudes determining, for each page among the first plurality of pages, a ratio value based on the first frequency and the second frequency of the page; and including, in the campaign-specific feature set of the campaign, pages, from among the first plurality of pages, that have ratio values which exceed a reference ratio threshold.

In other features, the determining which pages, from among the first plurality of pages, to include in the campaign-specific feature set of the campaign includes excluding, from the campaign-specific feature set of the campaign, pages, from among the first plurality of pages, that have ratio values which do not exceed the reference ratio threshold or have first frequencies that do not exceed a reference frequency threshold.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
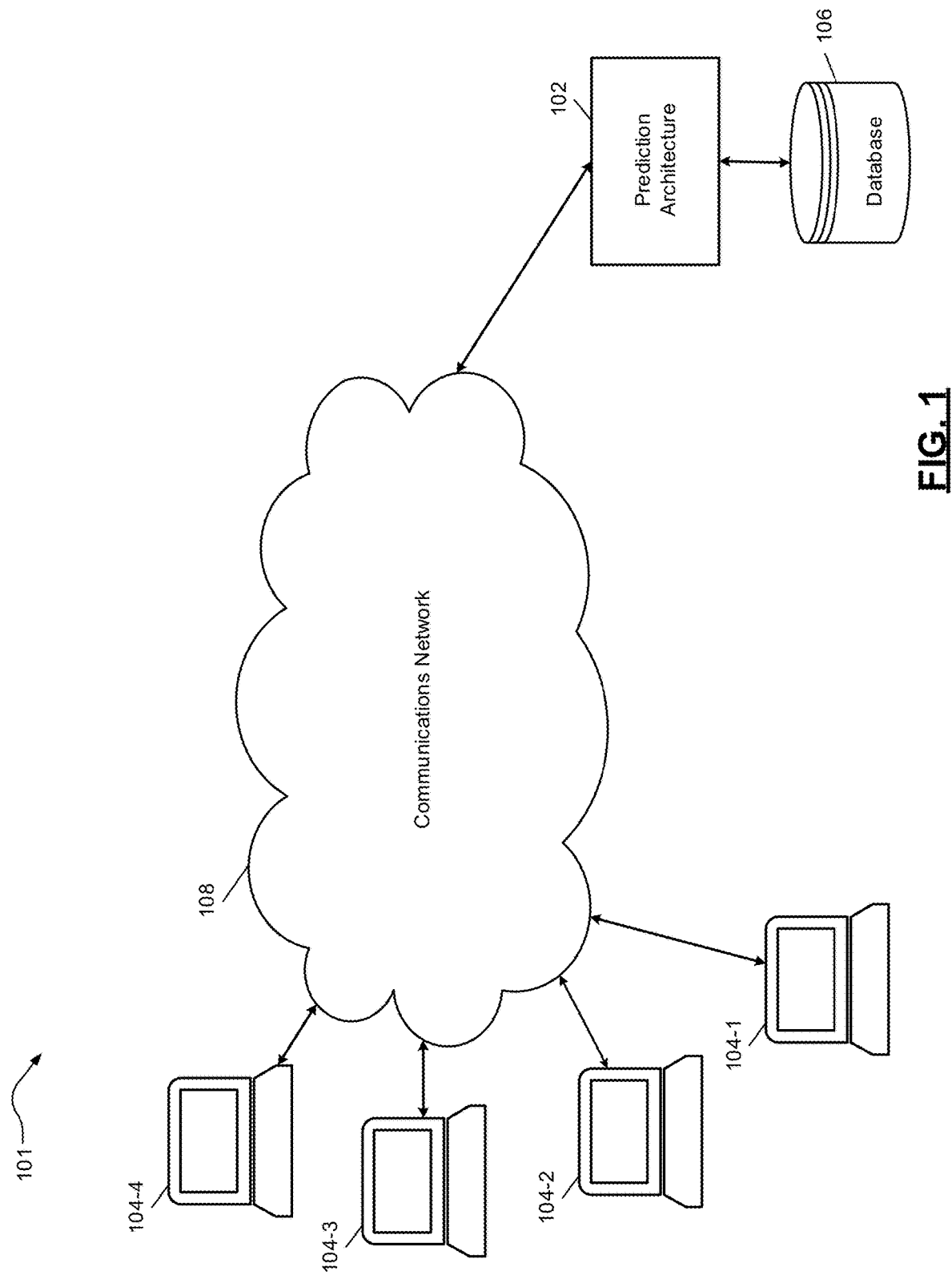
FIG. 1 is a diagram illustrating a portion of a communications system according to principles of the present disclosure.

Client data such as clickstream data, activity data and voice of the client analytics (VoCA) collected by a company can provide the company with a wealth of information about the company's clients. According to at least some example embodiments, clickstream data of a client includes a plurality of pages (e.g., pages of a website of the company) visited by a client, and may further include the dates and times at which the pages were visited by the client. According to at least some example embodiments, VoCA data of a client may include communications data regarding communications between the client and the company. For example, examples of such communications data include, but are not limited to, one or more of phone call data (e.g., time, date and contents of phone calls between the client and the company), chat message data (e.g., time, date and contents of chat messages between the client and the company), email data (e.g., time, date and contents of emails between the client and the company), and survey data (e.g., time, date and contents of survey questions provided to the client and survey answers provided by the client). completed by the client. However, depending on the size of the company, there may be tens of millions of client events the company wants to track each day. With so much data, it can be hard to know what data is relevant and extract meaningful insights. For example, the scale and the sheer amount of data to makes it challenging to process the data quickly.

A campaign interest prediction architecture according to principles of the present disclosure may use artificial intelligence (AI) to quickly organize large amounts of client data and feed the client data into a plurality of machine learning models that correspond, respectively, to a plurality of different types of content which the company can provide to its clients. The machine learning (ML) models each generate a score for each client and, based on the scores generated for each client, content is chosen and assigned to each client. For example, the different types of content may be different types of marketing campaigns, in which case the scores generated by the ML models are used to determine which marketing campaign to assign to each client. As used in the present specification, the term "client" is not limited to people or entities that have an active business relationship with the company (i.e., current clients), and thus may refer to any of former clients, potential clients and current clients.

According to principles of the present disclosure, the ML models are trained such that the scores generated by the ML models indicate campaign interest predictions for a client. The campaign interest predictions can be used to select a marketing campaign that is most likely to be of interest to the client, thus improving the chances that the client will take advantage of the opportunity being marketed to the client by the campaign that is ultimately assigned to the client.

FIGS. 1-7 below are explained with reference to an example in which a company associated with a campaign interest prediction architecture according to principles of the present disclosure is a financial services company. However, the campaign interest prediction architecture according to principles of the present disclosure is not limited to financial services companies and can be used with any type of company that collects, or has access to, client data. Similarly, though, for the purpose of simplicity, the present disclosure refers, primarily, to a campaign interest prediction architecture that generates scores which can be used to determine which of a plurality of marketing campaigns to assign to a client, the architecture according at least some example embodiments is not limited to generating scores for marketing campaigns. For example, the architecture according at least some example embodiments can be used to generate scores corresponding to any type of content, based, for example, on the nature of the client data used to train the ML models of the architecture.

FIG. 1 illustrates a portion of a communications system 101 according to principles of the present disclosure. The communications system 101 may include a prediction architecture 102, user devices 104 including first through fourth user devices 104-1-104-4, and a database (DB) 106. The prediction architecture 102 and the user devices 104 are capable of performing wired and/or wireless communications with each other via communications network 108. The communications network 108 may be any network capable of transmitting electronic data. Examples of the communications network 108 include, but are not limited to, a wireless communications network such as a cellular network or a WiFi network, a local area network (LAN), and the Internet. The prediction architecture 102 may be, for example a computer system such as a laptop, a desktop computer, a server or a network of processing nodes. Each of the user devices 104 may be any one of, for example, a laptop, a desktop computer, a smart phone, a tablet, a personal digital assistant, and a wearable device. According to at least some example embodiments, the DB 106 is an enterprise data warehouse (EDW).

According to at least one example embodiment, the prediction architecture 102 may include or be implemented by one or more circuits or circuitry (e.g., hardware) specifically structured to carry out and/or control some or all of the operations described in the present disclosure as being performed by the prediction architecture 102 (or an element thereof). According to at least one example embodiment, the prediction architecture 102 may include or be implemented by a memory and one or more processors executing computer-readable code (e.g., software and/or firmware) that is stored in the memory and includes instructions for causing the one or more processors to carry out and/or control some or all of the operations described in the present disclosure as being performed by the prediction architecture 102 (or an element thereof).

Figure 2:
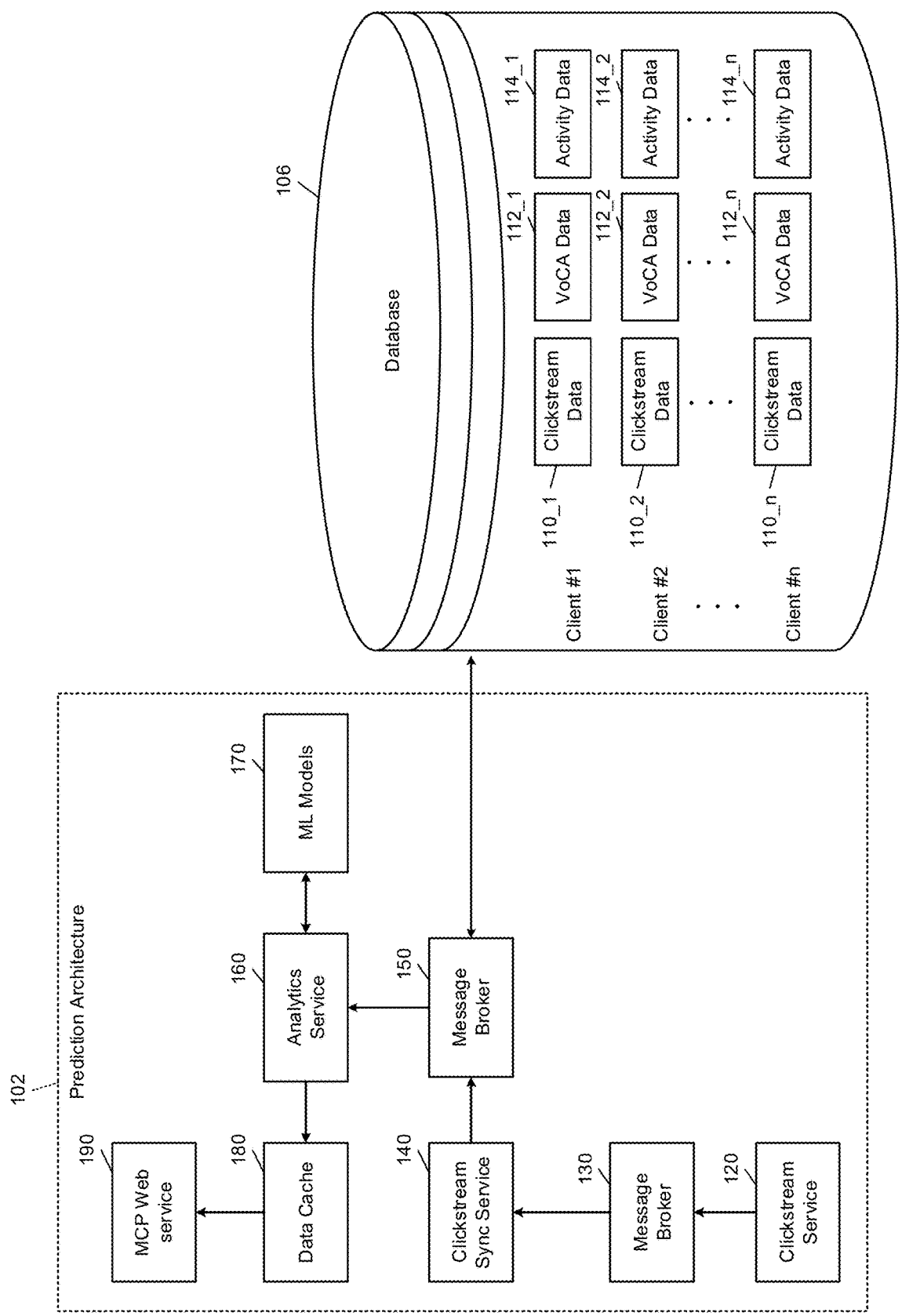
FIG. 2 is a diagram illustrating a campaign interest prediction architecture according to principles of the present disclosure.

FIG. 2 is a diagram illustrating a campaign interest prediction architecture according to principles of the present disclosure. Referring to FIG. 2, the prediction architecture 102 may include a clickstream service 120, a first message broker 130 a clickstream sync service 140, a second message broker 150, an analytics service 160, ML models 170, a data cache 180 and a marketing client profile (MCP) web service 190.

The clickstream service 120 provides clickstream data to the first message broker 130 which provides the client clickstream data to the clickstream sync service 140. The clickstream sync service 140 provides the clickstream data to the second message broker 150 which provides the clickstream data to the analytics service 160. The second message broker 150 may also provide the clickstream data to the DB 106. According to at least some example embodiments, first and second message brokers 130 and 150 are each instances of a RabbitMQ™ message broker.

Though not illustrated, the prediction architecture 102 may also include a service for providing VoCA data, and the VoCA data may be provided to the analytics service 160 and the DB 106. As is illustrated in FIG. 2, the DB 106 may store client data for each of clients #1-#n, where n is a positive integer. The client data stored in the DB 106 for each client may include a plurality of different types of data for each client including, for example, clickstream data 110, VoCA data 112 and activity data 114. According to at least some example embodiments, the client data stored in the DB 106 is historical client data. For example, the client data stored in the DB 106 may include all clickstream data, VoCA data and activity data the company has collected with respect to the client. Alternatively, the client data stored in the DB 106 includes clickstream data, VoCA data and activity data collected with respect to the client within a certain period of time (e.g., up to a desired number of years ago). Example operations of the analytics service 160 will now be discussed in greater detail below.

The analytics service 160 may call the ML models 170 and provide the clickstream data and VoCA data corresponding to each client to the ML models 170. According to at least some example embodiments, the ML models 170 are constructed using the programming language Python™ and may be stored in a Docker™ container. Prior to providing the clickstream data and VoCA data to the ML models, the analytics service 160 aggregates and organizes the clickstream data and the VoCA data around individual clients. For example, different ML models from among the ML models 170 may correspond to different marketing campaigns, respectively. Accordingly, different ML models from among the ML models 170 may take, as input data, different subsets of data from among the clickstream data and the VoCA data received at the analytics service 160. Accordingly, the analytics service 160 can prepare a different data feed for each model among the ML models 170 based on the particular subset of data needed by each model, as is explained in greater detail with respect to FIG. 3.

Figure 3:
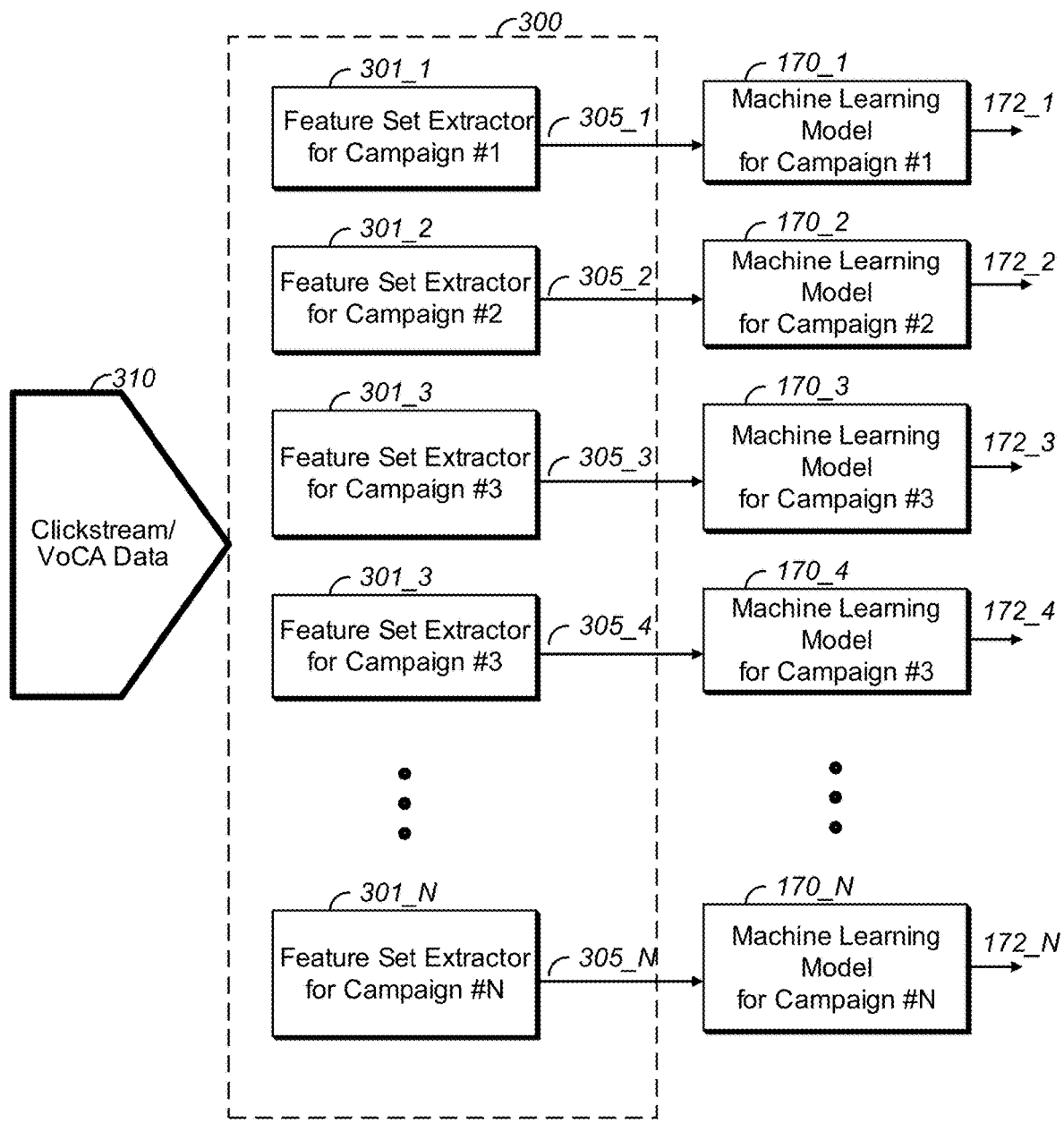
FIG. 3 is a diagram for explaining campaign-specific feature extraction according to principles of the present disclosure.

FIG. 3 is a diagram for explaining campaign-specific feature extraction according to principles of the present disclosure. The analytics service 160 may implement a feature extraction function 300. The feature extraction function 300 may receive clickstream/VoCA data 310 and may include a plurality of feature set extractors 301. According to at least some example embodiments, the prediction architecture 102 may include a feature set extractor and an ML model for each marketing campaign being considered for assignment to clients of the company associated with the prediction architecture 102.

For example, in the example illustrated in FIG. 3, the company associated with the prediction architecture 102 is considering N marketing campaigns for assignment to clients, where N is a positive integer greater than 1. Accordingly, there are N feature set extractors 301_1-301_N and N ML models 170_1-170_N. The clickstream/VoCA data 310 corresponds to a combination of the clickstream data and VoCA data which has been received at the analytics service 160 and organized, by the analytics service 160, with respect to clients. The organizing may include, for example, matching the clickstream data and VoCA data to the individual clients to which the clickstream data and VoCA data belongs, for example, by tagging the clickstream data and VoCA data with a tags corresponding to the individual clients.

The clickstream/VoCA data 310 may include clicks to many different pages (i.e., web pages) and may also include many different units of VoCA data (e.g., different terms and/or phrases from phone conversations the client had with representatives of the company). However, not all pages and units of VoCA data are relevant to each individual marketing campaign. For example, for each of marketing campaigns #1-#N, there may be a different subset of relevant pages and units of VoCA data. For example, the features (i.e., pages and units of VoCA data) that are relevant to marketing campaign directed to rolling over a 401(k) may be different than the features that are relevant to marketing campaign directed to options trading. Accordingly, each feature set extractor 301_x is configured to extract, from clickstream/VoCA data 310, a campaign-specific feature set for campaign #x, where the campaign-specific feature set for campaign #x (or, campaign-specific feature set #x) is a set of features (i.e., individual pages and/or VoCA units) that are relevant to campaign #x. Further, as is illustrated in FIG. 3, each feature set extractor 301_x provides a campaign-specific features 305_x to the ML models for campaign #x, ML model 170_x. The manner in which campaign-specific feature sets are chosen for each campaign will be discussed in greater detail below with reference to FIGS. 4-6.

In general, clickstream data includes clicks which cause the client that performed the click to travel from a page upon which the click was made (i.e., an "origin page") to a page to which the click points (i.e., a "next page"). Examples of clicks include, but are not limited to, a text link of the origin page, a picture link of the origin page, an item in a dropdown menu on the origin page, a button on the origin page, the act of moving a mouse cursor over and/or through a particular region of the origin page, and the act of making a particular gesture with the mouse cursor (e.g., while the client is visiting the origin page). As used in the present disclosure, a click could be any method of a client interacting with an origin page that, if performed, would cause the client to visit a next page, or any element of an origin page that, if selected by a client, would cause the client to visit a next page. Examples of visiting the next page or traveling from a current page to a next page include, but are not limited to: replacing the current page with the next page in an existing browser window; and opening a new browser window to display the next page with or without closing an existing browser window that displays the current page. Further, it is possible for the origin page and the next page to be the same page (e.g., when a link on a page points to the same page).

Thus, those skilled in the art will understand that multiple different clicks (e.g., clicks corresponding to different origin pages) can point to the same next page. However, in the present disclosure, for the purpose of simplicity, a unit of clickstream data (i.e., a click) is primarily referred to as in terms of the "page" which is the next page to which the click points. Further, the act of making a click may be referred to, for example, as "visiting a page." Thus, while a click on page A that points to page C and a click on page B that points to page C may be considered two different clicks, for the purpose of simplicity, in the present disclosure the aforementioned two different clicks may both be referred to as page C, and may not be considered as two unique units of clickstream data by the analytics service 160. However, at least some example embodiments are not limited to the present example of interpreting unique clicks. For example, according to at least some example embodiments, the analytics service 160 is capable of considering many different attributes of a click including, for example, the origin page of the click, the next page of the click, the type of device upon which the click was made, the location of the click on the origin page, and the type of click (e.g., text link, picture link, item in a dropdown menu, button, act of moving a mouse cursor over and/or through a particular region of the origin page, or act of making a particular gesture), and may consider two clicks to be unique when the two clicks differ with respect to any one of the attributes being considered.

Returning to FIGS. 2 and 3, ML models 170_1-170_N can use the corresponding campaign specific-features 305_1-305_N extracted from the clickstream/VoCA data 310 by the analytics service 160 to generate scores 172_1-172_N for each client. As is illustrated in FIG. 3, the analytics service 160 can distribute campaign-specific subsets of the clickstream/VoCA data 310 the ML models 170 simultaneously such that the ML models 170 can generate scores 172_1-172_N in parallel for each client. Scores 172_1-172_N each indicate a campaign interest prediction (e.g., a prediction of how likely it is that a particular client will be interested in a particular marketing campaign), and thus, may also be referred to as campaign interest prediction scores 172_1-172_N.

Scores 172 generated by the ML models 170 are stored in the cache 180. According to at least some example embodiments, the cache 180 is a Redis™ data structure store. The MCP web service 190 ultimately makes the decision about which marketing campaign to assign to each client based on the scores 172 that were generated for the client by the ML models 170 and stored in the data cache 180. Examples methods of using the prediction architecture 102 to assign campaigns to clients will now be discussed below with reference to FIG. 4.

Figure 4:
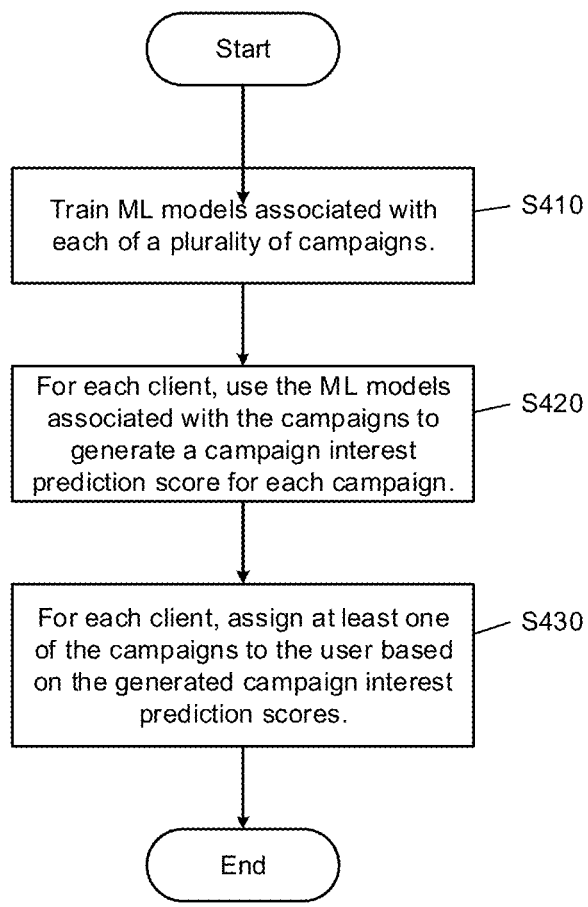
FIG. 4 is a flowchart illustrating a method of assigning campaigns to clients according to principles of the present disclosure.

FIG. 4 is a flowchart illustrating a method of assigning campaigns to clients according to principles of the present disclosure. Referring to FIG. 4, in step S410, the prediction architecture 102 trains ML models associated with each of a plurality of campaigns. For example, the prediction architecture 102 trains ML models 170_1-170_N illustrated in FIG. 3, which correspond to campaigns #1-#N, respectively. Step S410 will now be discussed in greater detail below with reference to FIGS. 5 and 6.

Example ML Model Training Method

Figure 5:
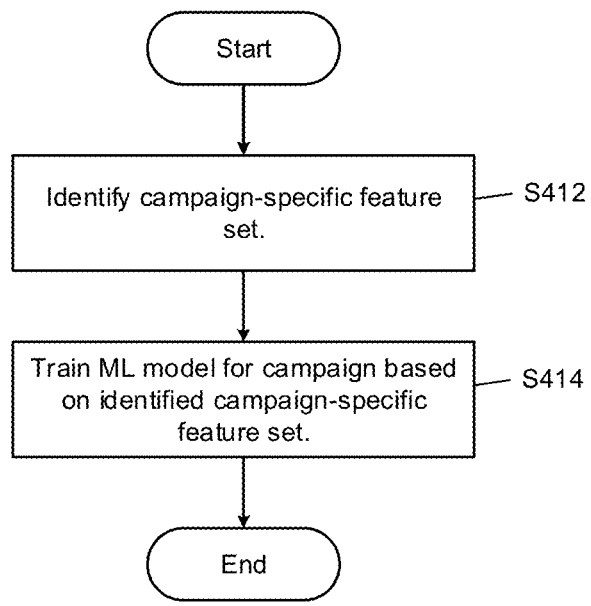
FIG. 5 is a flowchart illustrating a method of training a machine learning (ML) model to generate campaign interest predictions according to principles of the present disclosure.

FIG. 5 is a flowchart illustrating a method of training a machine learning (ML) model to generate campaign interest predictions according to principles of the present disclosure. According to at least some example embodiments, step S410 of FIG. 4 includes performing the steps illustrated in FIG. 5 with respect to each one of ML models 170_1-170_N. According to at least some example embodiments, step S410 of FIG. 4 includes performing the steps illustrated in FIG. 5 with respect to each one of ML models 170_1-170_N, in parallel. For the purpose of simplicity, FIG. 5 will be explained with reference to an example scenario in which ML model 170_1 (i.e., the ML model corresponding to campaign #1) is being trained, and campaign #1 is a marketing campaign directed to rolling over a 401(k). However, the steps of FIG. 5 may performed with respect to any of ML models 170_1 to 170_N (and, thus, any of corresponding campaigns #1-#N).

Figure 6:
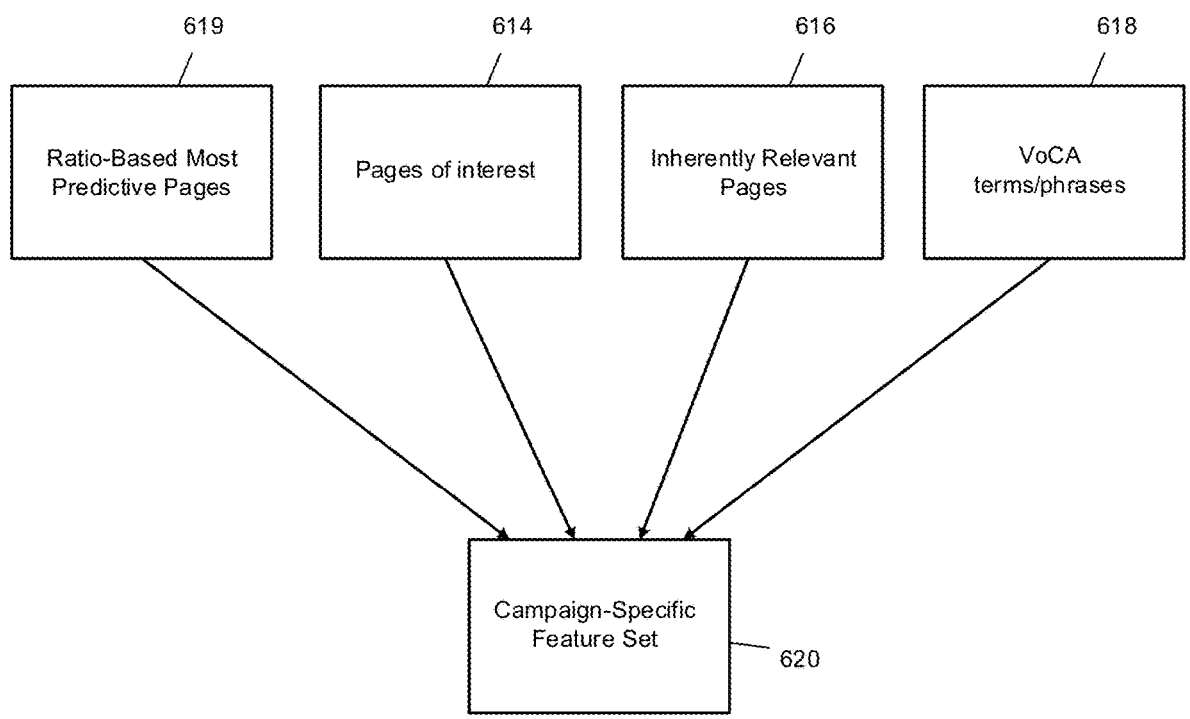
FIG. 6 is a diagram for explaining example contents of a campaign-specific feature set according to principles of the present disclosure.

Referring to FIG. 5, in step S412, a campaign-specific feature set is identified for the campaign to which the ML model corresponds (e.g., campaign #1 corresponding to ML model #1). FIG. 6 is a diagram for explaining example contents of a campaign-specific feature set according to principles of the present disclosure. As is illustrated in FIG. 6, a campaign-specific feature set 620 may include any or all of ratio-based most predictive pages 619, pages of interest 614, inherently relevant pages 616 and VoCA terms/phrases 618.

Pages of interest 614 may be, for example, company web pages that are determined by one more people at the company (e.g., one or more of subject matter experts, people who work certain businesses at the company, and/or people in certain marketing teams at the company) as being of interest with respect to campaign #1. Inherently relevant pages 616 are web pages that are presumed to be inherently relevant to campaign #1, for example, based on the name or content of the web page. For example, since campaign #1 is directed to rolling over 401(k)s, company web pages having titles and/or contents that are conspicuously related to the activity of rolling over 401(k)s may be included in the inherently relevant pages 616. Thus, according to at least some example embodiments, the pages of interest 614 and/or inherently relevant pages 616 may be determined "off-line."

Ratio-based most predictive pages 619 are pages that are clicked by clients who have performed an activity of interest to campaign #1 more often than by all clients, generally. An example manner in which the ratio-based most predictive pages 619 are determined will now be discussed below with reference to FIGS. 4 and 5.

Returning to step S412, in step S412, determination of the ratio-based most predictive pages 619 may include the prediction architecture 102 reading client data of all clients of the company (or a portion of the clients of the company) corresponding to a first period of time. The first period of time may be any period of time, for example, in accordance with the preferences of the company. For example, the first period of time may be one or more weeks, or one or more months. For example, the prediction architecture 102 may read, from the DB 106, 1 month of clickstream data 110 and activity data for clients #1-#n.

The activity data 114 of each client includes information about activities performed by each client including, for example, what activities were performed by the client and when the activities were performed. Accordingly, in step S412 the prediction architecture 102 may use the activity data 114 to determine which clients performed an activity that is an activity of interest with respect to campaign #1. For example, because campaign #1 is directed to rolling over a 401(k), in step S412 the prediction architecture 102 uses the activity data 114 to determine which clients rolled over a 401(k) within the first period of time.

Next, the prediction architecture 102 may analyze the clickstream data 110 of each client who is determined to have performed the activity of interest in order to identify all the pages visited by the client within a reference window of time (window W) before the activity of interest was performed, and a first frequency f 1 with which each identified page was visited (i.e., the number of clients that visited the page within window W). A size of the window W may be, for example, any period time that is smaller than the first period of time. Window W may be, for example 3 days.

After the prediction architecture 102 identifies which pages vested within the window W by the clients that rolled over their 401(k)s and determines, for each identified page, a frequency f 1 with which the page was visited in window W, the prediction architecture 102 determines a second frequency f 2 for each identified page. According to at least some example embodiments, for each identified page, the second frequency f 2 is the frequency with which the page was visited by all of clients #1-#n within window W.

Further, for each identified page, the prediction architecture 102 determines a ratio f_1/f_2. According to at least some example embodiments, the prediction architecture 102 includes each identified page for which the ratio f_1/f_2 exceeds a reference ratio threshold in the ratio-based most predictive pages 619 for campaign #1. Further, according to at least some example embodiments, any page for which the first frequency f_1 is below a reference frequency threshold is excluded from the ratio-based most predictive pages 619 for campaign #1. This way, when a page has a considerably high ratio f_1/f_2 primarily because that page was visited only a few times by the clients who rolled over their 401(k)s and only few times by clients #1-#n overall, the page will not be included in the ratio-based most predictive pages 619 for campaign #1. Values of the reference ratio threshold and reference frequency threshold may be set, for example, in accordance with the preferences of the company.

Returning to FIG. 6, according to at least some example embodiments, VoCA terms/phrases 618 may be determined in a manner similar to that discussed above with respect to any or all of ratio-based most predictive pages 619, pages of interest 614, inherently relevant pages 616. For example, VoCA terms/phrases 618 may include terms and/or phrases that are determined by one more people at the company (e.g., one or more of subject matter experts, people who work certain businesses at the company, and/or people in certain marketing teams at the company) as being of interest with respect to campaign #1 from among the terms and/or phrases extracted from voice data (e.g., phone call data) of the company's clients.

As another example, VoCA terms/phrases 618 may include terms and/or phrases that are presumed to be inherently relevant to campaign #1, for example, based on the name or content of the terms and/or phrases. For example, the term "401(k)" could be included in VoCA terms/phrases 618. As yet another example, in the same manner discussed above with respect to the ratio-based most predictive pages 619, a ratio f_1/f_2, may be determined for each term and/or phrase included in window W of VoCA data 112 of each client that rolled over their 401(k) within the first period time. VoCA terms and/or phrases that have ratios $f\_1/f\_2$ which satisfy a reference ratio threshold and first frequency values $f\_1$ that satisfy a reference frequency threshold may be include in VoCA terms/phrases 618.

Once the campaign-specific feature set 620 is determined, the prediction architecture 102 may proceed to step S414. In step S414, ML model 170_1 (i.e., the ML model corresponding to campaign #1) is trained based on the campaign-specific feature set 620 identified in step S412. In the example shown in FIGS. 1-3, the ML models 170 are implemented as binary Bernoulli naive Bayes classifiers. However, according to at least some example embodiments, ML models may be implemented in accordance with other types of ML examples of which include, but are not limited to, neural networks, random forest classifiers, logistic regression and boosted tree methods such as XGBoost.

When the ML model 170_1 is implemented as binary Bernoulli naive Bayes classifier, training in step S414 may include, for example, analyzing the client data (e.g., the clickstream data 110, VoCA data 112 and activity data 114) of each clients #1-#N, determining probability values for each feature included in the campaign-specific feature set 620 for campaign #1, and determining probability values with respect to the performance of the activity of interest with respect to campaign #1 (i.e., rolling over a 401(k)). The aforementioned probability values may be used to train the binary Bernoulli naive Bayes classifier in accordance with known methods of training Bernoulli naive Bayes classifiers.

Retuning to FIG. 4, after step S410, the prediction architecture 102 proceeds to step S420. In Step S430, campaign interest prediction scores are generated by each ML model for each client. For example, in step S420, the prediction architecture 102 may use each of ML models 170_1-170_N to generate N campaign interest prediction scores 172_1-172_N for each one of clients #1-#n (e.g., for a total of N×n prediction scores). Step S420 will now be discussed in greater detail below with reference to FIG. 7.

Figure 7:
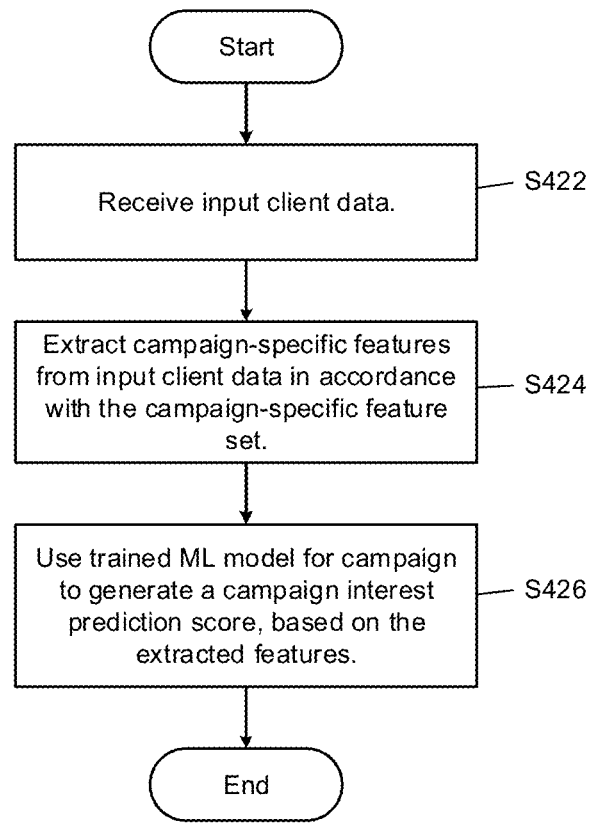
FIG. 7 is a flowchart illustrating a method of using an ML model associated with a campaign to generate a campaign interest prediction for a client according to principles of the present disclosure.

Example Method of Using a Trained ML Model to Generate Campaign Interest Prediction Scores FIG. 7 is a flowchart illustrating a method of using an ML model associated with a campaign to generate a campaign interest prediction for a client according to principles of the present disclosure. According to at least some example embodiments, step S420 of FIG. 4 includes performing the steps illustrated in FIG. 7 with respect to each one of ML models 170_1-170_N. According to at least some example embodiments, step S420 of FIG. 4 includes performing the steps illustrated in FIG. 5 with respect to each one of ML models 170_1-170_N, in parallel. For the purpose of simplicity, FIG. 7 will be explained with reference to an example scenario in which ML model 170_1 (i.e., the ML model corresponding to campaign #1) is being trained, and campaign #1 is a marketing campaign directed to rolling over a 401(k). However, the steps of FIG. 7 may performed with respect to any of ML models 170_1 to 170_N (and, thus, any of corresponding campaigns #1-#N).

Referring to FIG. 7, in step S422, input client data is received. For example, the Clickstream/VoCA data 310 of FIG. 3 received at the extraction function 300 of the analytics service 160 of FIG. 2 is an example of the client data received in step S422.

In step S424 features are extracted from the received input client data in accordance with the campaign-specific feature set 620 corresponding to campaign #1. For example, as is illustrated in FIG. 3, the feature set extractor 301_1 extracts campaign-specific features 305_1 from the clickstream/ VoCA data 310 and provides the extracted campaign-specific features 305_1 to the ML model 170_1. For example, the feature set extractor 301_1 may extract the campaign-specific features 305_1 in accordance with the campaign-specific feature set 620 for campaign #1 identified in step S412 of FIG. 5.

In step S426, the trained ML model for campaign #1 (i.e., ML model 170_1) is used to generate a campaign interest prediction score corresponding to campaign #1 (i.e., campaign interest prediction score 172_1) for the client whose input client data was received in step S422, based on the campaign-specific features 305_1 extracted in step S426. For example, in response to receiving the campaign-specific features 305_1 as input, the trained ML model 170_1 outputs a campaign interest prediction score for the client.

Returning to FIG. 4, after step S420, in step S430, for each client, the prediction architecture 102 (e.g., the analytics service 160) assigns a campaign from among campaigns #1-#N to the client based on the campaign interest prediction scores 172_1-172_N generated for each client in step S426 of FIG. 7.

For example, for each client, the prediction architecture 102 determines which of the campaign interest prediction scores 172_1-172_N is above a reference score threshold (e.g., 50% with respect to an example scenario in which each campaign interest prediction score 172 has a value between 0% and 100%).

With respect to each client, from among the campaign interest prediction score(s) 172 of the client that are determined to be above the reference score threshold, the prediction architecture 102 may determine the highest score 172 and assign the client to the marketing campaign associated with the highest score 172. Further, if there is a tie between highest scores that exceed the reference score threshold, from among campaign interest prediction scores 172_1-172_N, the prediction architecture 102 may assign the client to the marketing campaign that is identified as having the highest business value. Business values may be assigned to the various campaigns, for example, by one or more people at the company (e.g., one or more of subject matter experts, people who work certain businesses at the company, and/or people in certain marketing teams at the company).

If none of a client's campaign interest prediction scores 172 are determined to be above the reference score threshold, a conventional campaign assignment method may be used to assign a campaign to the client.

Continuous Training

According to at least some example embodiments, the ML models 170 are initially trained based on historical client data (e.g., clickstream data 110, VoCA data 112 and activity data 114 stored in the DB 106 for each client). However, for each new campaign interest prediction score 172 an ML model 170 generates, the prediction architecture 102 may keep track of the input campaign-specific features 305 based upon which the ML model 170 generated the campaign interest prediction score 172 (e.g., by storing the input campaign-specific features 305 in DB 106). Further, the campaign interest prediction score 172 may track the activities of the client for which the campaign interest prediction score 172 was generated in order to see if the client performs the activity of interest with respect to the campaign associated with the ML model 170, for example, within a particular period of time after the score 172 was generated for the client. After the period of time elapses, the prediction architecture 102 may use the previously stored input campaign-specific features 305 together with the determination of whether or not the activity of interest was performed within the period of time as training data for the ML model 170.

Accordingly, the activities performed (or not performed) by clients after campaign interest prediction scores 172 are generated for the clients by the ML models 170 may be used by the prediction architecture 102 as feedback to continuously train the ML models 170.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. The phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A method comprising:
   identifying a campaign-specific feature set for each campaign of a plurality of campaigns by
      determining a first group of clients, wherein the first group of clients is composed of clients who have performed an activity of interest with respect to the campaign, from among a plurality of clients,
      determining a first plurality of pages visited by the first group of clients within a window of time,
      determining, for each page among the first plurality of pages, a first frequency and a second frequency, the first frequency being a number of clients, from among the first group of clients, that visited the page within the window of time and the second frequency being a number of clients, from among the plurality of clients, that visited the page within the window of time, and
      determining which pages, from among the first plurality of pages, to include in the campaign-specific feature set of the campaign based on the first and second frequencies determined for each of the first plurality of pages by
         determining, for each page among the first plurality of pages, a ratio value based on the first frequency and the second frequency of the page, and
         including, in the campaign-specific feature set of the campaign, pages of the first plurality of pages with ratio values that exceed a reference ratio threshold,
   receiving client data of a client, the client data including at least one of clickstream data and analytic data of the client;
   for each of a plurality of trained machine learning (ML) models corresponding, respectively, to the plurality of campaigns
      extracting campaign-specific features of the campaign-specific feature set from the client data, and
      generating a campaign interest prediction score by inputting the campaign-specific features extracted for the ML model into the ML model; and
   assigning at least one campaign, from among the plurality of campaigns, to the client based on the generated campaign interest prediction scores,
   wherein the clickstream data includes a plurality of pages visited by the client, and
   wherein the analytic data of the client includes at least one of phone call data, chat message data, email data, or survey data of the client.

2. The method of claim 1, wherein the plurality of campaigns are marketing campaigns.

3. The method of claim 1, wherein the assigning of the at least one campaign comprises:
   determining a highest campaign interest prediction score from among the campaign interest prediction scores generated for the plurality of ML models; and
   assigning a first campaign to the client,
   wherein the first campaign is the campaign, from among the plurality of campaigns, to which the ML model that generated the highest campaign interest prediction score corresponds.

4. The method of claim 1 wherein:
   the plurality of trained ML models includes at least a first ML model and a second ML model,
   the campaign-specific features extracted from the client data for the first ML model are extracted in accordance with a first campaign-specific feature set,
   the campaign-specific features extracted from the client data for the second ML model are extracted in accordance with a second campaign-specific feature set, and
   the second campaign-specific feature set is different from the first campaign-specific feature set such that the campaign-specific features extracted from the client data for the first ML model are different from the campaign-specific features extracted from the client data for the second ML model.

5. The method of claim 1 wherein, each ML model is a Bernoulli naive Bayes classifier.

6. The method of claim 1, further comprising, for each campaign among the plurality of campaigns:
   extracting training data from historical client data of the plurality of clients based on the identified campaign-specific feature set, and
   generating the trained ML model, from among the plurality of trained ML models, that corresponds to the campaign by training a model based on the extracted training data.

7. The method of claim 1, wherein the determining which pages, from among the first plurality of pages, to include in the campaign-specific feature set of the campaign further comprises:
   excluding, from the campaign-specific feature set of the campaign, pages, from among the first plurality of pages, that have ratio values that do not exceed the reference ratio threshold or have first frequencies that do not exceed a reference frequency threshold.

8. The method of claim 1, further comprising:
tracking activities of the client after the campaign interest prediction score is generated to determine activities performed and not performed by the client.

9. The method of claim 8, further comprising:
continuously updating the plurality of trained ML models based the on activities performed and not performed by the client after the campaign interest prediction score is generated.

10. A computer system comprising:
memory storing computer-executable instructions; and
a processor configured to execute the computer-executable instructions to cause the computer system to perform
identifying a campaign-specific feature set for each campaign of a plurality of campaigns by
determining a first group of clients, wherein the first group of clients is composed of clients who have performed an activity of interest with respect to the campaign, from among a plurality of clients,
determining a first plurality of pages visited by the first group of clients within a window of time,
determining, for each page among the first plurality of pages, a first frequency as a number of clients, from among the first group of clients, that visited the page within the window of time and a second frequency as a number of clients, from among the plurality of clients, that visited the page within the window of time, and
determining which pages, from among the first plurality of pages, to include in the campaign-specific feature set of the campaign based on the first and second frequencies determined for each of the first plurality of pages by
determining, for each page among the first plurality of pages, a ratio value based on the first frequency and the second frequency of the page, and
including, in the campaign-specific feature set of the campaign, pages of the first plurality of pages with ratio values that exceed a reference ratio threshold,
receiving client data of a client, the client data including at least one of clickstream data and analytic data of the client;
for each of a plurality of trained machine learning (ML) models corresponding, respectively, to the plurality of campaigns
extracting campaign-specific features of the campaign-specific feature set from the client data, and
generating a campaign interest prediction score by inputting the campaign-specific features extracted for the ML model into the ML model; and
assigning at least one campaign, from among the plurality of campaigns, to the client based on the generated campaign interest prediction scores,
wherein the clickstream data includes a plurality of pages visited by the client, and
wherein the analytic data of the client includes at least one of phone call data, chat message data, email data, or survey data of the client.

11. The computer system of claim 10, wherein the plurality of campaigns are marketing campaigns.

12. The computer system of claim 10, wherein the assigning of the at least one campaign comprises:
determining a highest campaign interest prediction score from among the campaign interest prediction scores generated for the plurality of ML models; and
assigning a first campaign to the client,
wherein the first campaign is the campaign, from among the plurality of campaigns, to which the ML model that generated the highest campaign interest prediction score corresponds.

13. The computer system of claim 10 wherein:
the plurality of trained ML models includes at least a first ML model and a second ML model,
the campaign-specific features extracted from the client data for the first ML model are extracted in accordance with a first campaign-specific feature set,
the campaign-specific features extracted from the client data for the second ML model are extracted in accordance with a second campaign-specific feature set, and
the second campaign-specific feature set is different from the first campaign-specific feature set such that the campaign-specific features extracted from the client data for the first ML model are different from the campaign-specific features extracted from the client data for the second ML model.

14. The computer system of claim 10, wherein each ML model includes a Bernoulli naive Bayes classifier.

15. The computer system of claim 10, wherein the system is further caused to perform
extracting training data from historical client data of the plurality of clients based on the identified campaign-specific feature set, and
generating the trained ML model, from among the plurality of trained ML models, that corresponds to the campaign by training a model based on the extracted training data.

16. The computer system of claim 10, wherein the determining which pages, from among the first plurality of pages, to include in the campaign-specific feature set of the campaign further comprises:
excluding, from the campaign-specific feature set of the campaign, pages, from among the first plurality of pages, that have ratio values which do not exceed the reference ratio threshold or have first frequencies that do not exceed a reference frequency threshold.

* * * * *